Aug. 23, 1955   F. E. RAY   2,716,091
REGENERATION OF SOLID CONTACT MATERIAL
Filed Dec. 26, 1952
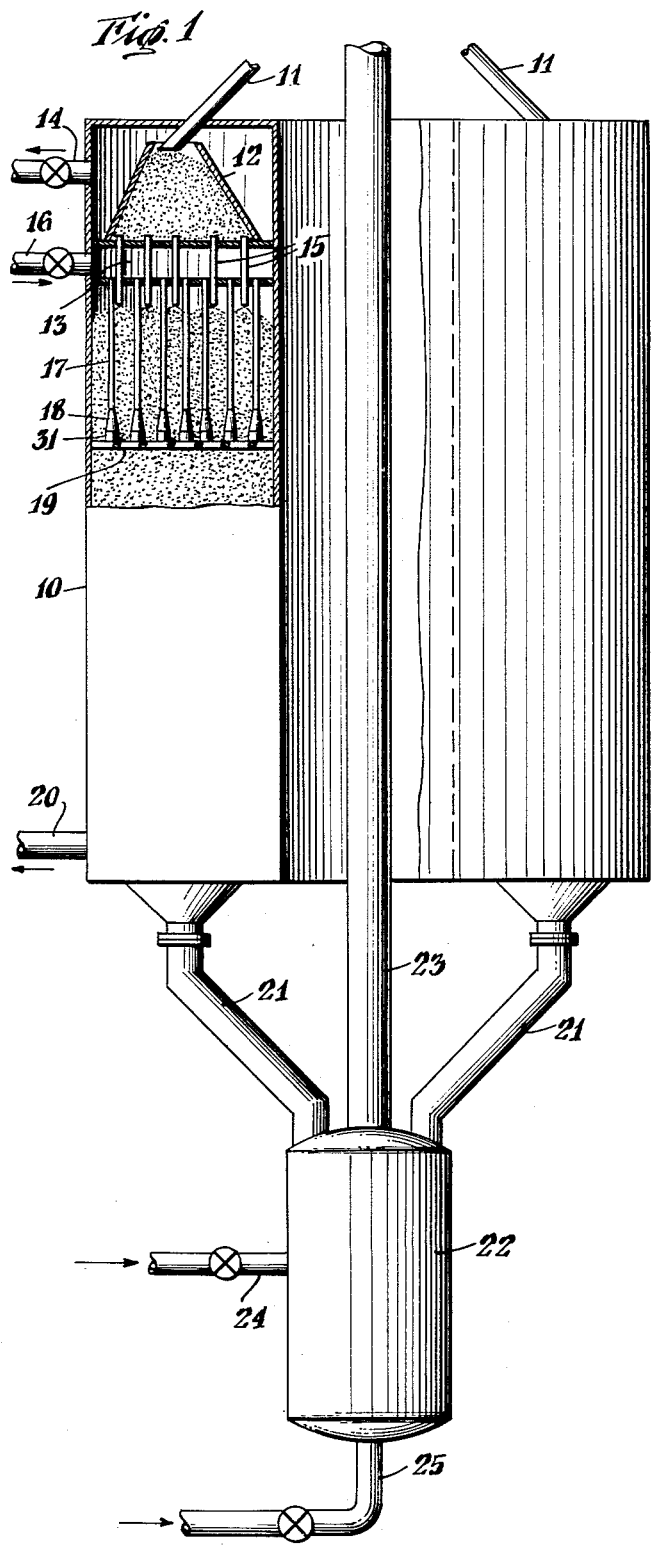
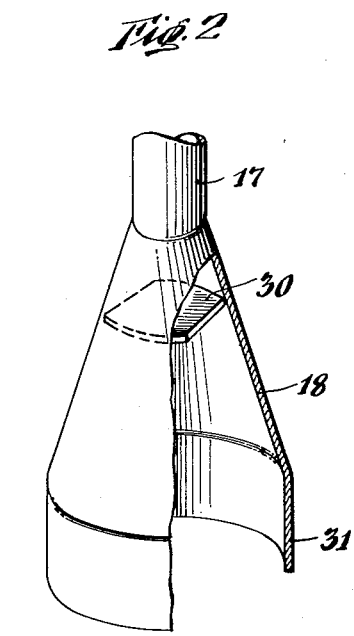
INVENTOR.
Frederick E. Ray
BY
ATTORNEY

United States Patent Office 2,716,091
Patented Aug. 23, 1955

2,716,091

REGENERATION OF SOLID CONTACT MATERIAL

Frederick E. Ray, Woodbury, N. J., assignor to Socony Mobil Oil Company, Inc., a corporation of New York Application December 26, 1952, Serial No. 327,951

1 Claim. (Cl. 252—418)

This invention relates to the regeneration of spent granular contact material in a moving bed hydrocarbon conversion process. It is particularly directed to an improved method and apparatus for contacting granular material containing carbonaceous deposits with air to effect removal of the deposits by burning.

Various hydrocarbon conversion processes, such as desulfurization, hydrogenation, reforming and cracking use granular solid particles as a catalyst or heat-carrying material to effect desired conversion reactions. The granular material may be gravitated as a compact column through reaction and regeneration zones and transferred from the bottom of one zone to the top of the other zone to complete an enclosed cyclic path. Hydrocarbons are passed through the voids in the bed of solids in the reaction zone and converted products are removed therefrom. The reaction zone is maintained at suitable reaction temperature and pressure. For example, for cracking the temperature may be about 800–1100° F. and the pressure about 5–30 p. s. i. (gauge). As the particles gravitate through the zone a carbonaceous material accumulates on the contacting surface. Therefore, air is blown through the bed of solids in the regeneration or reconditioning zone to burn the deposit and prepare the solids for reuse in the reaction zone. The pressure is maintained usually at about 0 p. s. i. in the regeneration zone and the temperature is usually maintained at about 1000–1300° F. it is desirable to burn the deposits from the contact material as rapidly as possible and yet if this is done at too rapid a rate, particularly when using catalytic materials, the catalyst may be damaged by the high temperature. When inerts are used solely as a heat-carrying material in processes such as visbreaking or coking, the temperature in the burner or kiln may be substantially above the limit for catalyst.

The contact material may be catalytic or non-catalytic. Suitable catalysts are well known in the art, such as various natural or treated clays or synthetic siliceous materials. A variety of inerts are also known such as fused silica, coke, carborundum, Corhart or Mullite. The size of the particles may range from about 0.5 to about 0.005 inch, depending upon the process. For example, in catalytic cracking it is desirable to use particles of uniform size and shape. This provides uniform gas distribution across the catalyst bed. It is preferred to use particles which are large enough to avoid excessive pressure drop across the bed. A suitable size range for cracking is about 4–12 mesh Tylor Screen Analysis.

Recently, a kiln was provided for the regeneration of spent contact catalyst in which the catalyst was gravitated as a compact column from a point near the top of the vessel. Air was introduced into a housing above the bed of catalyst in the upper portion of the kiln and passed downwardly into the bed through depending drop pipes. The gas released from the pipes into the bed travelled in two streams upwardly and downwardly through the bed. One of the streams was withdrawn from the top of the vessel and the other was withdrawn from the bottom of the vessel. Distributors of gradually increasing cross-section were located at the bottom of the depending drop pipes to bring the gas into contact with the catalyst more uniformly. A strap of steel was placed laterally across the distributors in a horizontal plane in such a way that the downwardly-moving gas struck the plate and was dispersed to some extent. It has been found that the gas flow through the distributors causes the catalyst to strike the horizontal straps under the distributors with the results that some of the catalyst is broken and the strap is eroded to some extent. Also, horizontal spacer bars located across the vessel beneath the distributors, designed to positively locate the lower end of the depending pipes, and strengthen the structure, are eroded to a large extent by the whipping about of the catalyst under the distributor.

It is an object of this invention to provide a method and means for introducing a combustion-supporting gas into a spent solid bed through apparatus of the type described above with minimum catalyst attrition or erosion of the metal.

In this invention the air is introduced into a gravitating bed of catalyst in the kiln through a tube extending down into the bed and terminating in an outwardly-tapered, open-bottomed distributor. A plate baffle is located in the distributor below the air tube to break up and disperse the air so it will not impinge at high velocity on the catalyst surface below the distributor. A vertical skirt is located at the lower end of the distributor having a constant cross-section and height of at least that expressed by the equation $$H = KU\left(\frac{T}{P}\right)^{2/3}$$

U being the gas velocity in feet per second at the top of the skirt, T is the temperature of the gas in degrees Rankine, and P is the absolute pressure at the top of the skirt in p. s. i., whereby the air is distributed into the catalyst bed without turbulence of the catalyst under the distributors.

The invention will now be described in more detail with reference to the attached figures.

Figure 1 is a vertical view, partially in section, of a typical kiln incorporating the features of this invention.

Figure 2 is an isometric sketch of the bottom of the air tube, showing the extension skirt attached to the distributor.

Referring to the Figures 1 and 2, the kiln 10 shown is of annular cross-section for use in a moving bed conversion system which incorporates a gas lift projected upwardly through the open central region of the kiln for upward transfer of the catalyst. Particles are gravitated through the pipes 11 into the region enclosed by the frustoconical bases 12, located in the upper portion of the vessel 10. The baffles 12 are located over header boxes 13 and confine the catalyst to a cross-sectional area less than that of the vessel 10, so as to permit gas to flow upwardly around the header boxes 13 to the gas discharge pipe 14. Transfer pipes 15 are projected downwardly through the header box 13 to transfer catalyst below the box. The catalyst discharged from the transfer pipes 15 expands to provide a gravitating column of catalyst covering the entire cross-section of the vessel. Air is introduced into the header box 13 through the pipe 16 and travels downwardly through the depending pipes 17, which are uniformly distributed across the header box and terminate in the kiln at a uniform level below the top of the bed of catalyst. Distributors 18, in the form of truncated cones, are located at the bottom of the air pipes 17. The distributors are attached to the horizontal spacer bars 19. The gas introduced into the bed by the air pipes 17 splits into two streams, one travelling upwardly through the bed and the other travelling downwardly. The upper stream disengages from the catalyst about the transfer pipes 15 and travels upwardly about the header box 13 to the withdrawal pipe 14 in the upper portion of the vessel. The lower stream passes downwardly through the bed to withdrawal channels, not shown, and is removed from the vessel through the pipe 20. The depending pipe air introduction scheme provides gas introduction into the bed at an intermediate level with a minimum amount of the bed cross-section at the level of gas introduction being used for gas introduction apparatus. The regenerated catalyst is withdrawn from the bottom of the vessel through the conduits 21 and introduced into the lift feed tank 22. A lift gas is introduced into the tank 22 through the pipes 24 and 25 and the particles are conveyed upwardly through the lift pipe as part of a continuous enclosed cyclic path.

Figure 2 shows an isometric view of the lower end of the air pipe. The distributor 18 shown is in the form of a truncated cone, however, other shapes may be used. For example, the distributor may be in the form of a truncated pyramid having triangular or other polygonal cross-section. The horizontal baffle 30 located diametrically across the upper portion of the distributor may, if desired, be eliminated. The skirt 31 has a uniform cross-section equal to that of the bottom of the distributor 18 and extends downward vertically from the bottom of the distributor. It is found that the height of the skirt is dependent upon the velocity of the gas at the bottom of the expanded portion of the distributor and that the relationship of height of skirt to gas velocity is equal to $$H = KU\left(\frac{T}{P}\right)^{2/3}$$

where
$H$ = height of skirt in feet,
$U$ = gas velocity at bottom of distributor, in ft./sec. (at 60° F. and 1 atm.)
$T$ = gas temperature ° R.
$P$ = gas pressure in distributor, p. s. i. a.

and $K$ is a constant which depends upon the catalyst being used primarily. For granular catalyst of about 4–12 mesh Tyler, usually used in moving bed cracking systems, $K$ = approximately 0.01.

Thus, the gas introduction means comprises a long drop pipe of uniform cross-section, a distributor at the bottom of the pipe having a portion of gradually increasing cross-section, and a vertical skirt at the bottom of the expanded portion of uniform cross-section and a height which is at least long enough to reduce the turbulence of the air stream. The expanded section or distributor is designed as follows:

The funnel portion of the distributor is designed as a conical section having an apex angle $\alpha = 60$ degrees, so as to minimize dead catalyst piles at the sides of the cone. The diameter at the lower end of the cone is made such that the total cross-sectional area of all the distributors is about 25–30 per cent of the total kiln cross-sectional area. It is customary practice to use 1 distributor for about every 0.7 to 0.85 square foot of total kiln cross-sectional area, so that the maximum distance from the bottom edge of the distributor or cone section of the distributor is about 6 inches to the bottom edge of the adjacent distributor.

Commercial kilns using gas pipes projected down into the catalyst bed for feeding air to the bed at an intermediate level and incorporating an expanded distributor at the bottom of the pipes of frusto-conical shape with a horizontal plate baffle across the upper portion of the distributor have been found to produce high attrition. Excessive erosion of the spacer bars which are located between adjacent distributors and of the underside of the plate baffle and the interior of the distributors has been observed in these kilns after only a few months operation. A model was made of a gas pipe and distributor out of transparent plastic of the same size as that used in a commercial kiln for a standard 15,000 bbls. per day T. C. C. system. This model was operated at the same air flow rate used in the commercial kiln in a bed of granular catalyst also at an air flow rate of the same kinetic energy as used in a commercial kiln and the operation was observed. To simulate the worst condition (hot air), the cold air rate in the model was increased 55 per cent so as to have the same kinetic energy as the air in the commercial kiln. It was seen that the catalyst was violently agitated under the distributors by the air entering the catalyst bed. The commercial gas introduction apparatus comprises a 60° cone attached to the end of a 2-inch pipe with a deflector baffle plate located about one-third of the way down the cone in a horizontal position diametrically across the interior of the cone. The air stream in passing around the plate baffle is thrown into a flow pattern which causes catalyst to boil up into the dead space under the plate. Some of the particles then fall or are thrown into the air stream passing the plate, which accelerates their fall back into the catalyst bed. It was found that by adding a skirt of uniform cross-section to the bottom of the distributor, this agitation of the catalyst was eliminated provided the skirt was at least above a critical minimum height. It was found that a skirt 6 inches long was adequate to reduce the air turbulence for an air flow of about 99 s. c. f. m., whereas a skirt 9 inches long was needed to reduce the air turbulence for an air flow of about 153 s. c. f. m. These air flows through the model correspond to the same kinetic energy as the total air rate to the commercial kiln of 31,000 s. c. f. m. at temperatures of 295 and 1000° F. These temperatures represent commercial operation with cold and hot regeneration air.

I claim:

The method of regenerating a spent catalyst in a regeneration zone which comprises: passing catalyst downwardly as a compact column through a regeneration zone, introducing air into a confined zone located above the bed of solids in said regeneration zone, passing the air downwardly through at least one elongated, laterally-confined passage to a level a substantial distance below the surface of the bed of catalyst in said zone, expanding the stream of air gradually near the bottom of said laterally-confined passage, passing the expanded stream through a vertical skirt at the lower end of the confined passage having a height, H, of at least that expressed by the equation $$H = KU\left(\frac{T}{P}\right)^{2/3}$$

where H is the height in feet, K is a constant = 0.01, and U is the velocity of the air at the top of the skirt in feet per second measured at 60° F. and atmospheric pressure, T is the temperature of the gas in degrees Rankine, and P is the absolute pressure in the distributor in pounds per square inch, whereby the air is distributed into the catalyst bed without turbulence of the catalyst under the distributor, and withdrawing flue gas from said catalyst bed at levels above and below said skirt substantially removed from the lower end of said vertical skirt.

References Cited in the file of this patent
UNITED STATES PATENTS 2,423,013    Evans _____ June 24, 1947
2,458,412    Payne _____ Jan. 4, 1949